April 12, 1932.  L. G. BURNAM  1,853,113
CARRYING HANDLE
Filed July 6, 1931  3 Sheets-Sheet 1
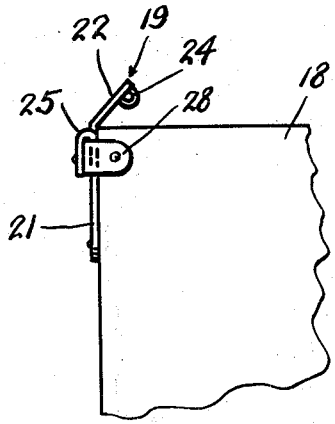
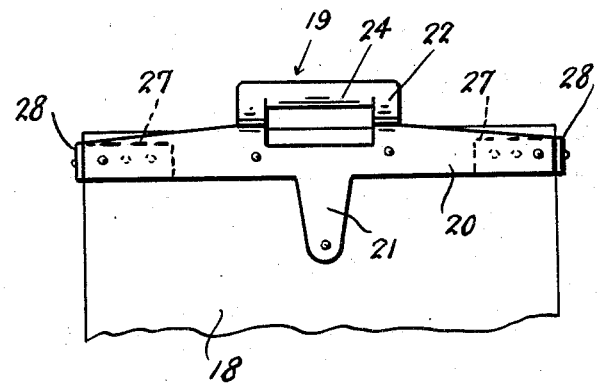
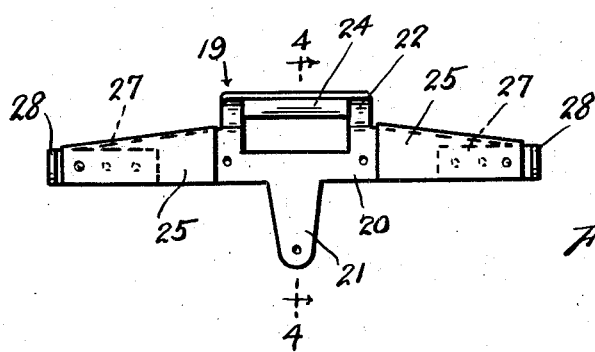
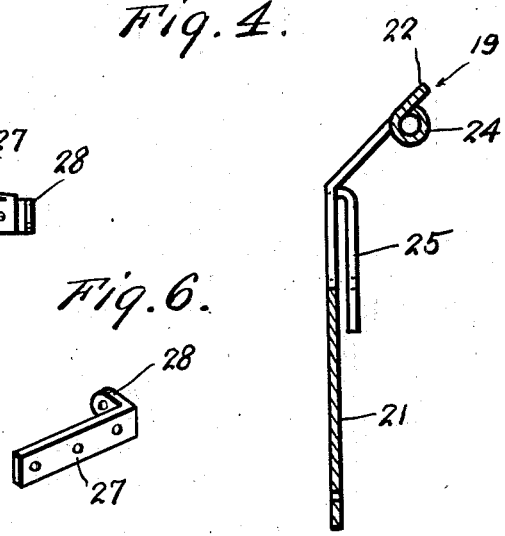
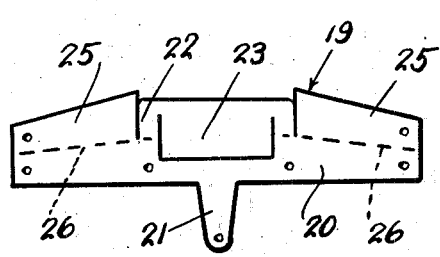
Inventor
L. G. Burnam
By Clarence A. O'Brien
Attorney April 12, 1932.  L. G. BURNAM  1,853,113
CARRYING HANDLE
Filed July 6, 1931  3 Sheets-Sheet 2
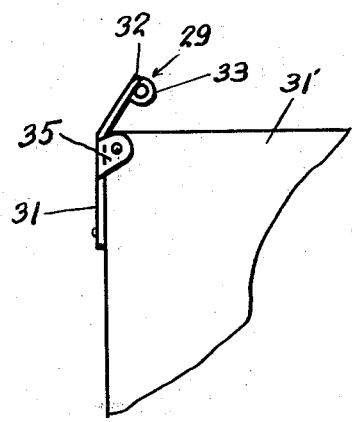
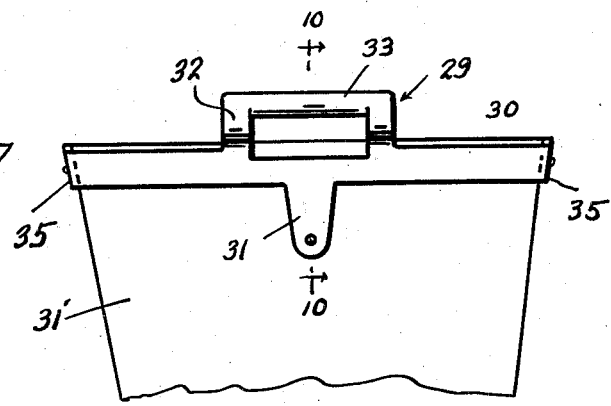
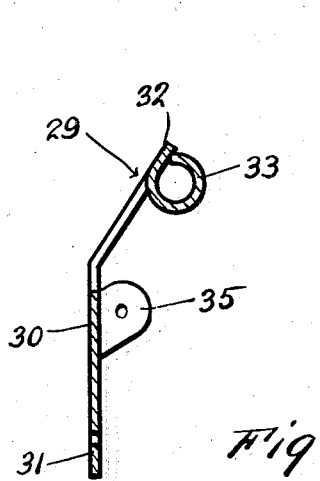
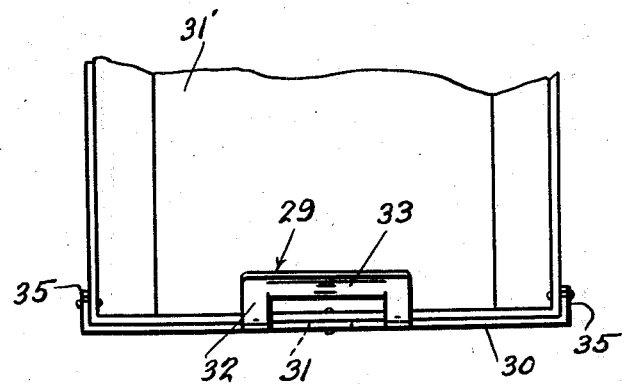
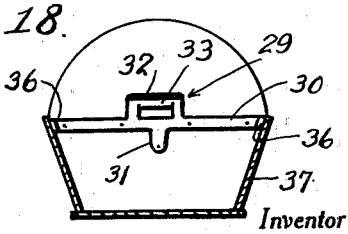
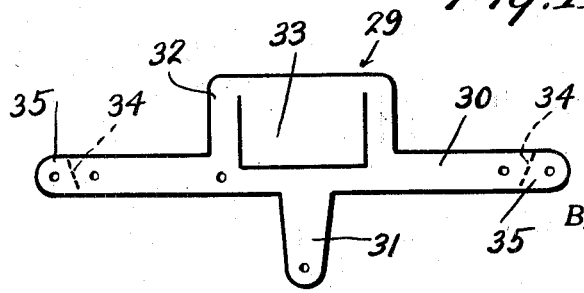
Inventor
L. G. Burnam
By Clarence A. O'Brien
Attorney

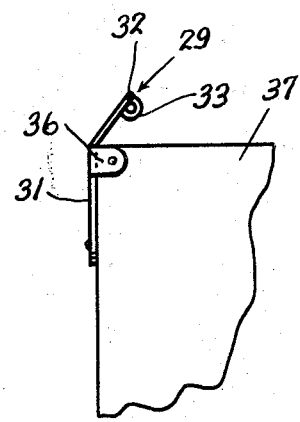
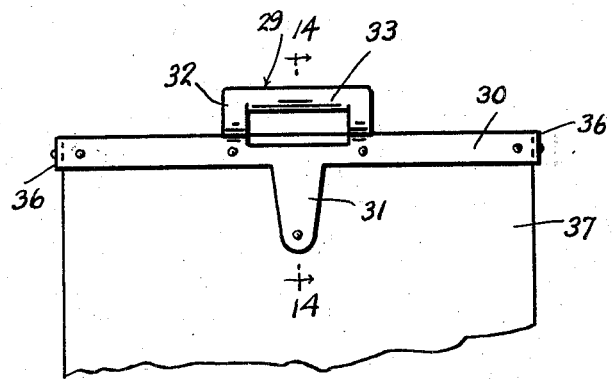
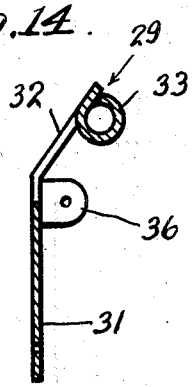
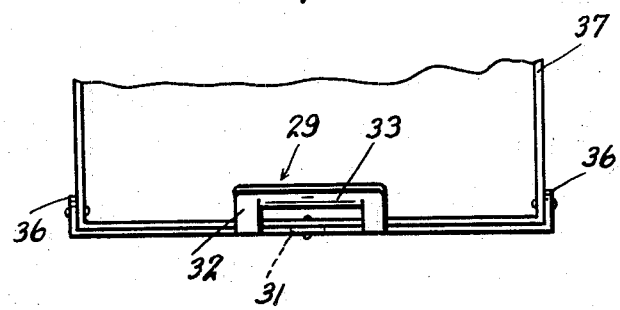
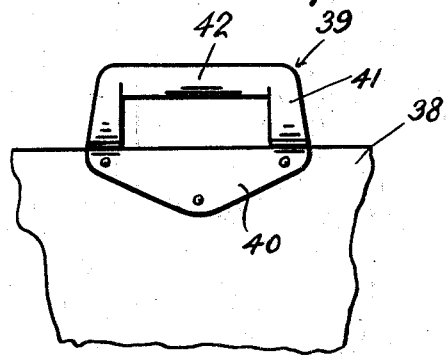
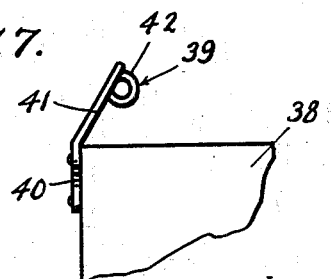

Patented Apr. 12, 1932

1,853,113

UNITED STATES PATENT OFFICE

LEONARD G. BURNAM, OF MANSFIELD, ILLINOIS

CARRYING HANDLE

Application filed July 6, 1931. Serial No. 549,010.

This invention relates to certain structural improvements and refinements embodied in the construction of distinguishable embodiments of handles applicable to diversified types and kinds of receptacles such as boxes, baskets and the like.

In carrying the inventive conception into operative effect, I have developed a practical and up-to-date handle appliance in the form of an attachment susceptible of qualifying as an efficient carrier means for innumerable types of receptacles, whether said receptacles be of wood, metal, or composite material.

Otherwise stated, the improved handle appliance, generically comprehended, is characterized by a simple system of mechanical details especially designed and cooperable so as to constitute exclusive and structurally distinguishable features in an article of this classification.

It has been found that a handle appliance of the type herein illustrated and hereafter explicitly described is adequate in fulfilling the requirements in that it embraces the ability, simplicity and dependability whereby it will endure under rough usage and handling.

Moreover, it has been found from actual practice that the devices of this application possess such requisite qualifications as to provide the desirable additive features which make for commercial success and utility in practice.

In order to convey a clear impression and understanding of the inventive concept, I have adopted and herein illustrated the preferred embodiments of the invention, and these will be separately and systematically described in order that the reader may appreciate these novel contributions to the prior art.

In the drawings:

Figure 1 shows an end view of a desirable type of handle applied to a commodity receptacle.

Figure 2 is an end elevational view thereof observing the structure in a direction from right to left in Figure 1.

Figure 3 is an inside elevational view of the handle appliance per se.

Figure 4 is a sectional view taken approximately on the plane of the line 4—4 of Figure 3.

Figure 5 is a plan view of the metal blank from which the appliance is stamped and subsequently formulated into a complete operative carrying handle.

Figure 6 is a perspective view of one of the details.

Figure 7 is a view like Figure 1 showing a different embodiment of the invention.

Figure 8 is a view like Figure 2 observing Figure 7 in a direction from left to right.

Figure 9 is a top plan view of Figure 8.

Figure 10 is a section on the line 10—10 of Figure 8.

Figure 11 is a plan view of the blank from which this particular embodiment of handle is developed.

Figure 12 is a view similar to Figure 7 showing a still further embodiment of the invention.

Figure 13 is a view observing Figure 12 in a direction from left to right.

Figure 14 is a section on the line 14—14 of Figure 13.

Figure 15 is a top plan view of Figure 13.

Figure 16 is an end view of an exceptionally simplified form of the invention.

Figure 17 is an edge view of the handle shown in Figure 16.

Figure 18 is a sectional view through a high walled container showing the internal application of the handle structure.

Attention is first invited to Figures 1 to 6 inclusive. In Figures 1 and 2 for example, the box or receptacle is designated by the numeral 18 and this happens to be a receptacle whose side and end walls are straight and parallel with respect to each other. The handle appliance here is designated by the numeral 19 and is primarily adapted for external application to the end wall and attachment to the side walls.

Referring to Figure 5 it will be noted that the principal part thereof is formed from a single stamped blank of metal of appropriate dimensions. The body portion is designated by the numeral 20 and forms an abuttal strap to engage the end wall of the box. On the lower edge and at the intermediate part of this strap is a pendant which is apertured to provide an attaching ear 21. The strap 20 is also apertured to permit it to be riveted, nailed or otherwise secured in place. Just above the part 21 is a portion 22 which forms a sort of a U-shaped bail and struck out from this is a small panel 23 which is bent upon itself and in fact rolled to form a tubular cylindrical handgrip 24 as shown in Figure 4.

Thus the features 22, 23 and 24 actually form the carrier portion of the appliance. The wing-like extensions 25 are adapted to be bent down into parallelism with the body portion 20 on the fold line 26 and these function as keepers of sheaths to accommodate the adjustable L-shaped attaching brackets 27. These brackets are obviously extensible and designed to accommodate boxes of different proportions.

Each bracket includes a short tanged end 28 apertured to provide an attaching ear secured to the side wall of the box as illustrated in Figures 1 and 2. In actual practice the U-shaped portion 22 is bent at an appropriate angle to overly the open top of the box for appropriate balancing and hand clearance.

Attention is now invited to sheet 2 of the drawings disclosing Figures 7 to 11 inclusive illustrating a slightly different type of handle appliance or attachment. Here the complete attachment is represented by the numeral 29 and it is formed from a blank of metal of the type disclosed especially in Figure 11. The body portion 30 is in the form of an abuttal strap which abuts the end wall of the tapered container or receptacle 31. This is formed on its bottom edge and centrally with a depending apertured attaching lug or ear 31 while the portion 32 provides the bendable U-shaped bail and struck from this is the panel 33 which is rolled and bent upon itself to form the handgrip illustrated in Figure 10.

Score or fold lines 34 are slightly inclined with respect to the longitudinal axis of the strap 30 to define attaching terminals or ears 35. These when bent to assume the angles represented in Figures 7 to 10 inclusive are especially adapted for securely fastening the complete device to the complemental inclined walls of the tapered receptacle.

The embodiment of the invention illustrated in Figures 12 to 15 inclusive is substantially identical to that shown in Figures 7 to 11 inclusive except that the apertured attaching ears 36 are bent at true right angles to render this particular form of handle applicable to a straight sided or walled receptacle 37. In view of this likeness between the two forms of the invention just described the same reference characters are utilized to designate corresponding parts.

The form of the invention shown in Figures 16 and 17 also possesses common characteristics being especially adapted for attachment to a straight walled box or receptacle 38. This particular handle is distinguished by the numeral 39, is formed from a single metal stamping constructed to provide a substantially triangular attaching flange 40, a U-shaped bail 41, and a rolled handgrip 42 carried by the bight portion of the bail.

It is though that the description taken in connection with the drawings will enable a clear understanding of the invention to be had. Therefore, a more lengthy description is thought unnecessary.

While the preferred embodiment of the invention has been shown and described, it is to be understood that minor changes in shape, size, materials and arrangement of parts coming within the field of invention claimed may be resorted to in actual practice if desired without departing from the spirit and scope of the appended claims.

The form of the handle illustrated in Figures 7 and 8 is applicable to the type of container indicated by the numeral 37 in Figure 18. Here the container has tapered side and end walls and the end walls are much higher than the side walls and have curved upper edges. Moreover the handle structure 29 in this arrangement is applied to the interior face of the end wall at about the elevation shown and the handgrip so inclined from the end wall to provide the desired clearance. It is evident, therefore, that in accordance with the terms of the invention the handle structure is either susceptible of internal or external location and capable of application to various types of containers.

I claim:

1. As a new article of manufacture, a carrying handle of the class described comprising a longitudinally elongated apertured receptacle abuttal strap having bendable end terminals constituting attaching ears, having an intermediate lower edge pendant constituting an additional attaching ear and having a central upstanding bendable U-shaped part forming a carrying bail, said carrying bail having its center portion rolled to provide a tubular substantially cylindrical handgrip.

2. As a new article of manufacture, a carrying handle of the class described comprising a longitudinally elongated apertured receptacle abuttal strap having bendable end terminals constituting attaching ears, having an intermediate lower edge pendant constituting an additional attaching ear and having a central upstanding bendable U-shaped part forming a carrying bail, said carrying bail having its center portion rolled to provide a tubular substantially cylindrical handgrip, the aforesaid terminal attaching ears being bent to assume substantially obtuse angular positions to adapt the strap for fastening to a tapered wall receptacle.

3. As a new product of manufacture, a single sheet metal stamping cut to form a longitudinally elongated abuttal and attaching strap, end apertured attaching ears and a depending intermediate attaching ear, as well as a U-shaped carrying bail, the portion defining said bail having a part struck out to constitute a panel, and said panel being rolled upon itself to form a tubular handgrip.

4. In a handle appliance of the class described comprising a longitudinally elongated abuttal strap adapted to be secured to the end wall of a receptacle, the intermediate upper portion thereof being provided with a U-shaped bail and an associated handgrip, the intermediate lower portion being fashioned to provide a depending attaching ear, the end portion being formed with bendable flaps defining a pair of open-ended sheath-like keepers, and extensible L-shaped brackets associated with said keepers.

In testimony whereof I affix my signature.

LEONARD G. BURNAM.